United States Patent
Coppersmith

(10) Patent No.: US 11,997,995 B1
(45) Date of Patent: Jun. 4, 2024

(54) RETAINING SYSTEM FOR FISHING APPARATUS AND METHOD

(71) Applicant: Daniel John Coppersmith, Matthews, NC (US)

(72) Inventor: Daniel John Coppersmith, Matthews, NC (US)

( * ) Notice: Subject to any disclaimer, the term of this patent is extended or adjusted under 35 U.S.C. 154(b) by 254 days.

(21) Appl. No.: 17/701,889

(22) Filed: Mar. 23, 2022

(51) Int. Cl.
*A01K 87/02* (2006.01)
*A01K 87/06* (2006.01)

(52) U.S. Cl.
CPC .............. *A01K 87/06* (2013.01); *A01K 87/02* (2013.01)

(58) Field of Classification Search
CPC ...... A01K 87/06; A01K 87/02; A01K 87/008; A01K 87/009
USPC ............................................................ 43/22
See application file for complete search history.

(56) References Cited

U.S. PATENT DOCUMENTS 303,186 A * 8/1884 Price ...................... A01K 87/06
43/22

FOREIGN PATENT DOCUMENTS

GB 1078570 A * 12/1963
GB 2462898 A * 3/2010 ............. A01K 87/06
JP H09298992 A * 11/1997
KR 200348681 Y1 * 5/2004
KR 200468466 Y1 * 8/2013
WO WO-2015037470 A1 * 3/2015 ............. A01K 87/00

OTHER PUBLICATIONS

YouBetchaOutdoors, "Cold Snap Reel Wrap Installation" Feb. 11, 2017, Youtube https://www.youtube.com/watch?v=ASm2iULTYxY (Year: 2017).*
Cold Snap Outdoors, "Cold Snap Reel Wrap Product Review" Jan. 17, 2014, Youtube https://www.youtube.com/watch?v=Gmi6TRz4AKY (Year: 2014).*
Cold Snap Outdoors, "Cold Snap Reel Wrap Pro Kit" Oct. 8, 2019, Youtube https://www.youtube.com/watch?v=dkhGYPSpwnU (Year: 2019).*
Weekend Sportsman, "EyeconicFishing Ice Vice Premium Reel Retention Bands Rod Mount System for Cork or Foam Handles", Nov. 12, 2019, Youtube https://www.youtube.com/watch?v=1vZjShaKYGQ (Year: 2019).*
Eyeconic Fishing, Eyeconic Fishing Facebook Page Sep. 19, 2019 and Nov. 20, 2018, Facebook https://www.facebook.com/EyeconicFishing/ (Year: 2018).*

* cited by examiner

Primary Examiner — Darren W Ark
Assistant Examiner — Katelyn T Truong
(74) Attorney, Agent, or Firm — Ted Masters

(57) ABSTRACT

A retaining system for fishing apparatus includes elastic bands which hold the reel on the handle of a fishing rod. In another embodiment the elastic bands prevent sleeves which hold the reel on the handle from disengaging from the reel. In both embodiments the elastic bands have been specially designed to permit easy rolling along the handle of the fishing rod.

6 Claims, 11 Drawing Sheets

FIG. 1
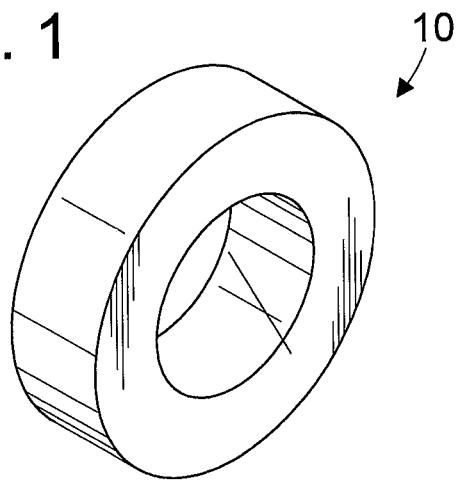
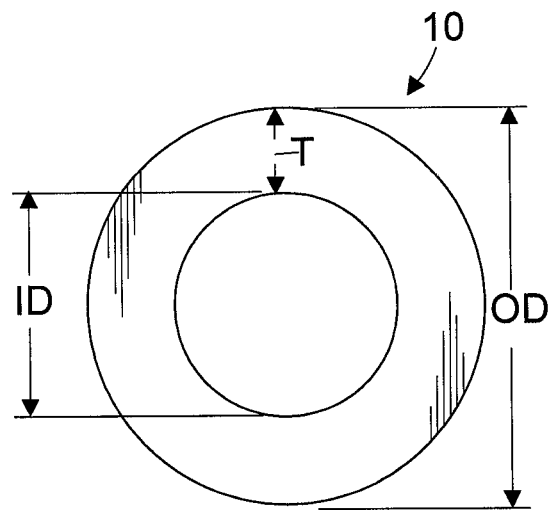
FIG. 3
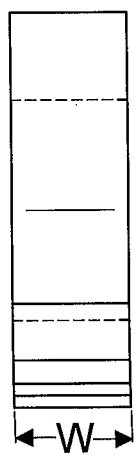
FIG. 2

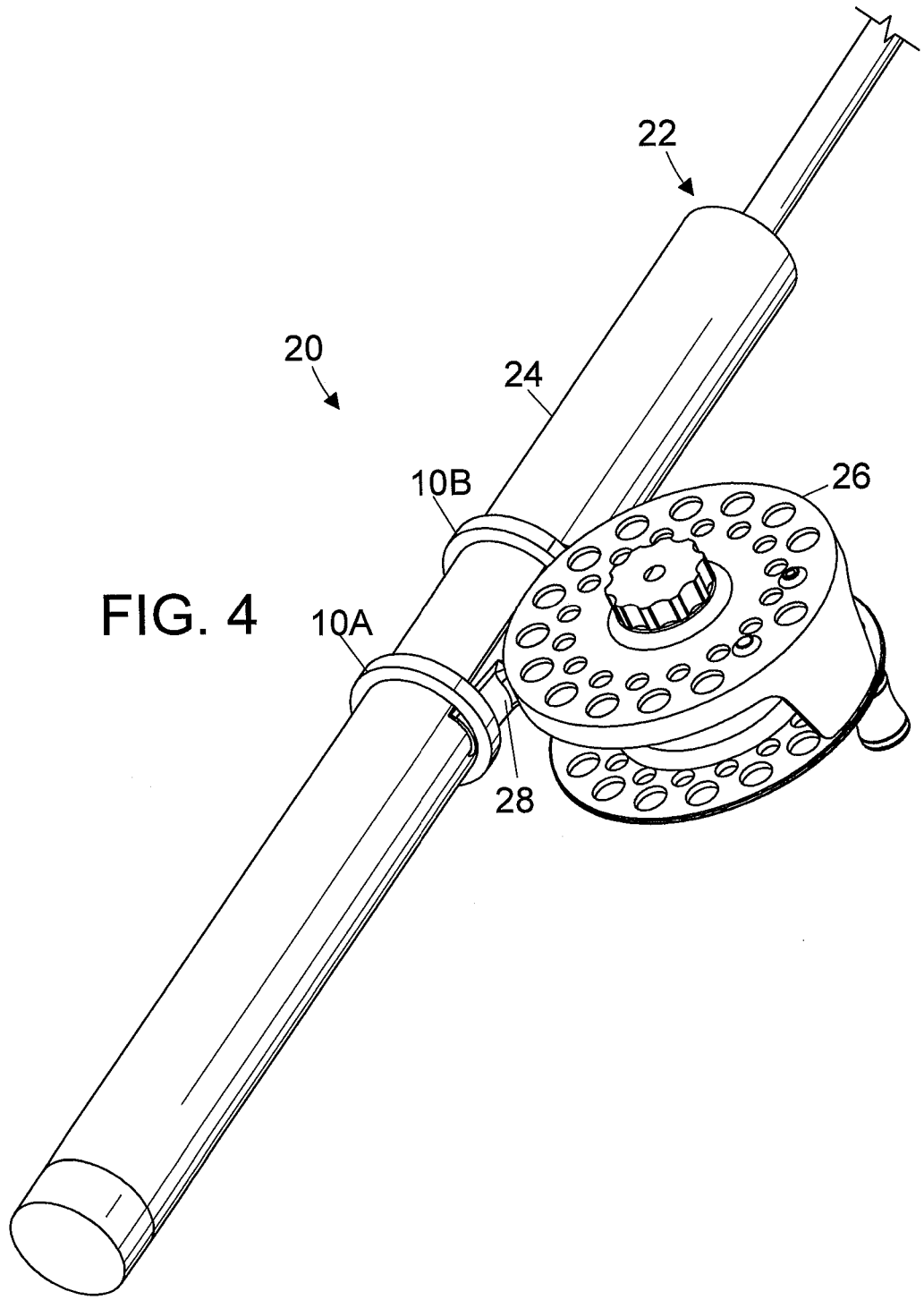

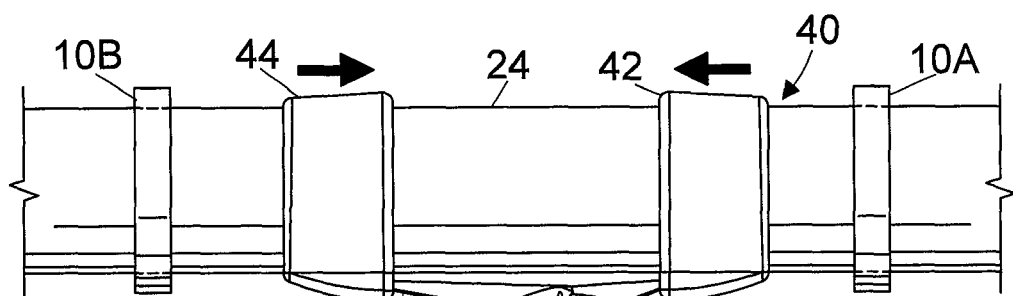
FIG. 13
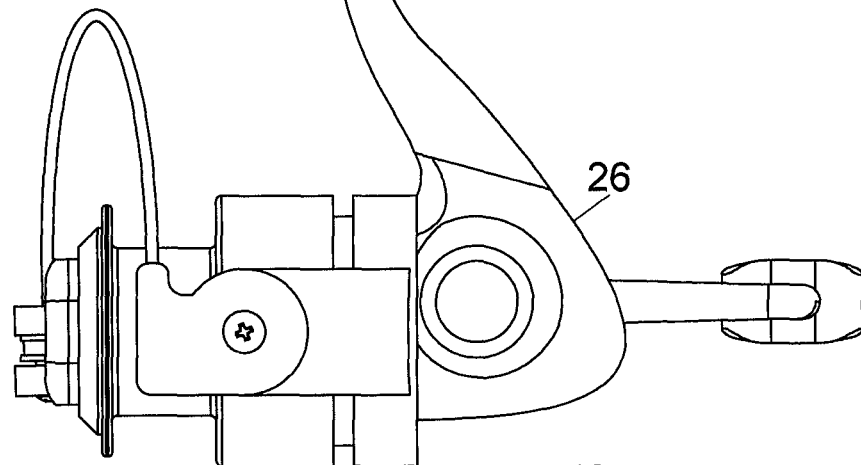
FIG. 14
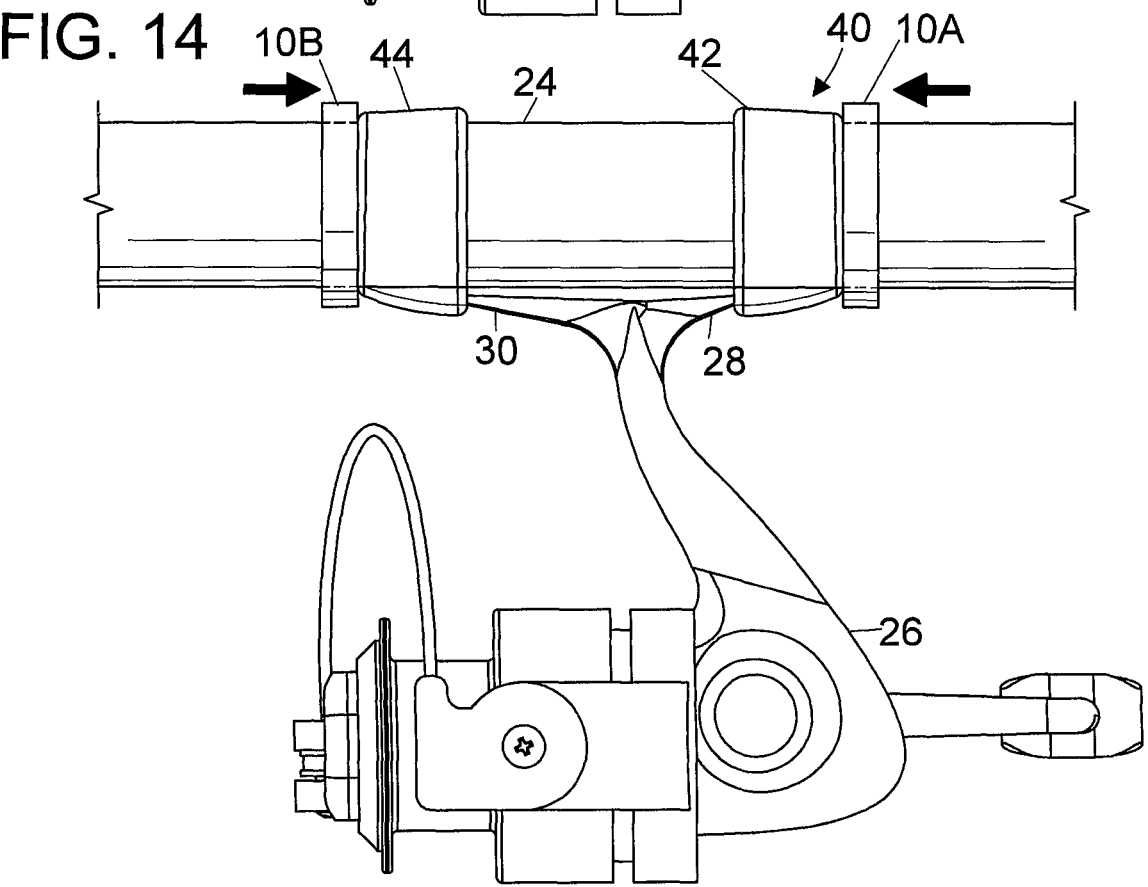

RD = DW+OW+PW+IW
RDM = DW + OW
RDm = PW + IW

RETAINING SYSTEM FOR FISHING APPARATUS AND METHOD

CROSS REFERENCE TO RELATED APPLICATION

None

TECHNICAL FIELD

The present invention pertains generally to fishing, and more particularly to a system and method for retaining a fishing reel on the handle of a fishing rod.

BACKGROUND OF THE INVENTION

Retaining systems for fishing apparatus are known in the art. In one such system two slidable plastic sleeves (aka hoods) surround the handle of a fishing rod which is typically made of cork. The sleeves are placed over the feet of the reel to hold the reel in place on the handle. While this system offers great versatility it is dependent on an exact sizing between the sleeves and the cork handle. There needs to be a certain amount of friction between the sleeves and the handle, otherwise the sleeves will not stay in place and the reel can disconnect from the handle. For example, when fishing in a dry environment such as the Rocky Mountains the cork tends to dry out and slightly shrink. The same can happen when storing the rods in a house which is air conditioned or heated. Under these conditions, the sleeves can move causing the sleeves to come off of the reel feet, and the reel to come off of the handle. Such an unfortunate situation is most likely to occur when a large fish is on the line.

In another system elastic retention bands are utilized to hold the feet of the reel tightly on the handle of a fishing rod.

BRIEF SUMMARY OF THE INVENTION

The present invention is directed to a system and method for retaining fishing apparatus, and specifically for retaining a fishing reel (fly reel or spinning reel) on the handle of a fishing rod. In one embodiment the retaining system utilizes elastic bands to hold the feet of the fishing reel securely on the handle. As such, the reel cannot inadvertently come off of the handle, is easily installed on the handle, can be quickly moved to any desired position along the handle, and reels can be rapidly changed out. In another embodiment, the elastic bands are utilized to prevent existing handle sleeves from moving along the handle and releasing the reel.

The dimensions of the elastic bands are specifically designed to provide sufficient elastic strength to hold the reel on the handle, allow easy installation on the handle without the need for special installation tools, and permit rolling of the elastic bands along the handle.

Advantages of the present invention include:

1. It can be put on a 25.4 mm (one inch) fishing rod handle by hand without specialized tools
2. It an be easily moved up or down the rod handle by rolling (by hand) in approximately 8 mm increments, with additional nudging into place requiring just a few seconds. The rolling also makes a snapping or clicking sound.
3. The number of bands can be varied depending on whether the angler is using ultralight or medium action gear (typically 4 bands, 2 on each reel foot) or using heavy fishing gear for larger fish (typically 6 bands, 3 on each reel foot).
4. The elastic bands can be used as a stop for a reel sleeve. This is only possible because of the unique properties this shape has of remaining stubbornly in place until an angler deliberately moves it to a new location, approximately 8 millimeters at a time (one half rotation).
5. Because it is easy to put on and into position on the handle, an angler would be encouraged to create a custom arrangement on their rod handle to improve the grip. This is highly subjective and not for everyone so it has to be an option an angler can choose for themselves, which means they need to be able to put the bands on without specialized tools and they need to be able to easily move the bands into position but then require the bands to stay in place.
6. The bands can also be easily configured by an angler to create a custom grip improvement on the handle by putting an arbitrary number of bands in preferred locations on the handle. This may improve casting accuracy, lessen hand fatigue, result in better hook sets when fighting a fish and, with various colors to choose from, add a fashionable appeal to an otherwise ordinary looking fishing rod.

In accordance with an embodiment, a retaining system for fishing apparatus includes a fishing rod having a handle. A reel is connected to the handle, the reel having a first foot and a second foot. A first elastic band surrounds the handle and the first foot. A second elastic band surrounds the handle and the second foot. The first and second elastic bands each have an unstretched width W of between 5 mm and 7 mm.

In accordance with another embodiment, the first and second elastic bands each have an unstretched width W of 6 mm.

In accordance with another embodiment, a third elastic band surrounds the handle and the first foot, the third elastic band disposed adjacent to the first elastic band. A fourth elastic band surrounds the handle and the second foot, the fourth elastic band disposed adjacent to the second elastic band. The third and fourth elastic bands each having an unstretched width W of between 5 mm and 7 mm.

In accordance with another embodiment, the third and fourth elastic bands each have an unstretched width W of 6 mm.

In accordance with another embodiment, the first and second elastic bands are positionable along the handle by rolling.

In accordance with another embodiment, a retaining system for fishing apparatus includes a fishing rod having a handle. A reel is connected to the handle, the reel having a first foot and a second foot. A first sleeve connects the first foot to the handle, and a second sleeve connects the second foot to the handle. A first elastic band surrounds the handle and abuts the first sleeve, and a second elastic band surrounds the handle and abuts the second sleeve. The first and second elastic bands each have an unstretched width W of between 5 mm and 7 mm.

In accordance with another embodiment, the first and second elastic bands each have an unstretched width W of 6 mm.

In accordance with another embodiment, the first and second elastic bands are positionable along the handle by rolling.

Other embodiments, in addition to the embodiments enumerated above, will become apparent from the following detailed description, taken in conjunction with the accompanying drawings, which illustrate, by way of example, the principles of the retaining system and method for fishing apparatus.

BRIEF DESCRIPTION OF THE DRAWINGS

FIG. 1 is an enlarged perspective view of an elastic band;

FIG. 2 is an enlarged front elevation view of the elastic band;

FIG. 3 is an enlarged side elevation view of the elastic band;

FIG. 4 is a perspective view of a retaining system for fishing apparatus in accordance with the present invention;

FIG. 13 is a fragmented elevation view as in FIG. 12 with the sleeves positioned over the feet of the reel;

FIG. 14 is a fragmented elevation view as in FIG. 13 with the elastic bands positioned to abut the sleeves;

DETAILED DESCRIPTION OF THE INVENTION

Figure 5:
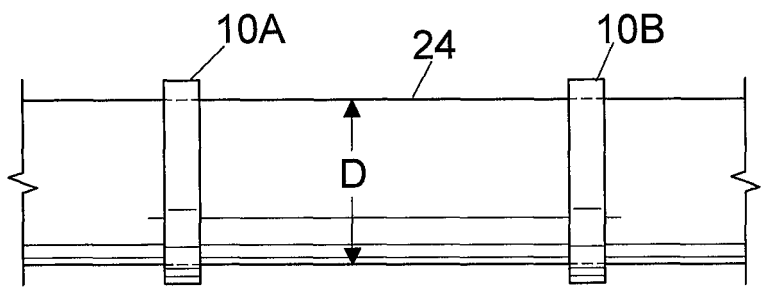
FIG. 5 is a fragmented elevation view of a handle of a fishing rod with two elastic bands installed.

Referring initially to FIGS. 1-3 there are illustrated enlarged perspective, enlarged front elevation, and enlarged side elevation views respectively of an unstretched (at rest) elastic band, generally designated as 10. Elastic band 10 is circular and in the shown embodiment has an unstretched outer diameter OD of 20.5 mm, an unstretched inner diameter ID of 11.5 mm, an unstretched thickness T of 4.5 mm, and an unstretched width W of between 5 mm and 7 mm. Meaning a width W of 5 mm, a width W of 7 mm, or any value therebetween. A width W of between 5 mm and 7 mm is a critical feature of the present invention. A Width W of more than 7 mm can be difficult to install on handle 24, and also can be difficult or impossible to position along handle 24 by rolling and nudging. Conversely a width W of less than 5 mm does not provide sufficient elastic gripping action to securely hold reel 26 on handle 24. The critical range of 5 mm to 7 mm has been determined by testing.

In an embodiment, elastic band 10 is fabricated from silicone and is 68.3% 40 duro base, 27.3% fumed silica, 3.4% colorant dispersion, and 1.5% peroxide cure. In terms of structural properties, i.a.w. ASTM D1414 and ASTM D412 Tensile and Elongation, elastic band 10 has Stress at Break of 2.16 Mpa, a Strain at Break of 549.12%, a Stress at 100% of 0.22 Mpa, and a Stress at 300% of 0.81 Mpa. Additionally i.a.w. ASTM D1414 and ASTM 2240 O-Ring Durometer elastic band 10 has a Shore Shore A of 42.0

Now referring to FIG. 4 there is illustrated is a perspective view of a retaining system for fishing apparatus in accordance with the present invention, the retaining system generally designated as 20. Retaining system 20 includes a fishing rod 22 which has a handle 24. Handle 24 is cylindrical and typically fabricated from cork. As shown handle 24 has a diameter D of 25.4 mm (one inch) (refer to FIG. 5). A reel 26 (a fly reel as shown) is connected to handle 24. Reel 26 has a first foot 28 and a second foot 30 (refer also to FIG. 6). A first elastic band 10A surrounds handle 24 and first foot 28, and a second elastic band 10B surrounds handle 24 and second foot 30 (these are the elastic band 10 of FIGS. 1-3). That is, elastic bands 10A and 10B retain (hold) reel 26 in place on handle 24. In an embodiment, first 10A and second 10B elastic bands each have an unstretched width W of between 5 mm and 7 mm, with a width of 6 mm being optimal (refer also to FIGS. 1-3 and the associated discussion). As will be discussed later, the dimensions of first 10A and second 10B elastic bands change slightly when the bands are stretched to install on handle 24. It is noted that elastic bands 10A and 10B may be installed on handle 24 from the heel end of the handle or in some cases from the rod end. Moreover, the elastic bands can be a multitude of colors to add a fashionable look to the fishing rod. It is also noted that the elastic bands can provide a friction-enhancing surface to improve the user's grip of the handle. Also, additional elastic bands can be positioned at desired locations on the handle to provide an even better grip for improved casting performance.

Figure 6:
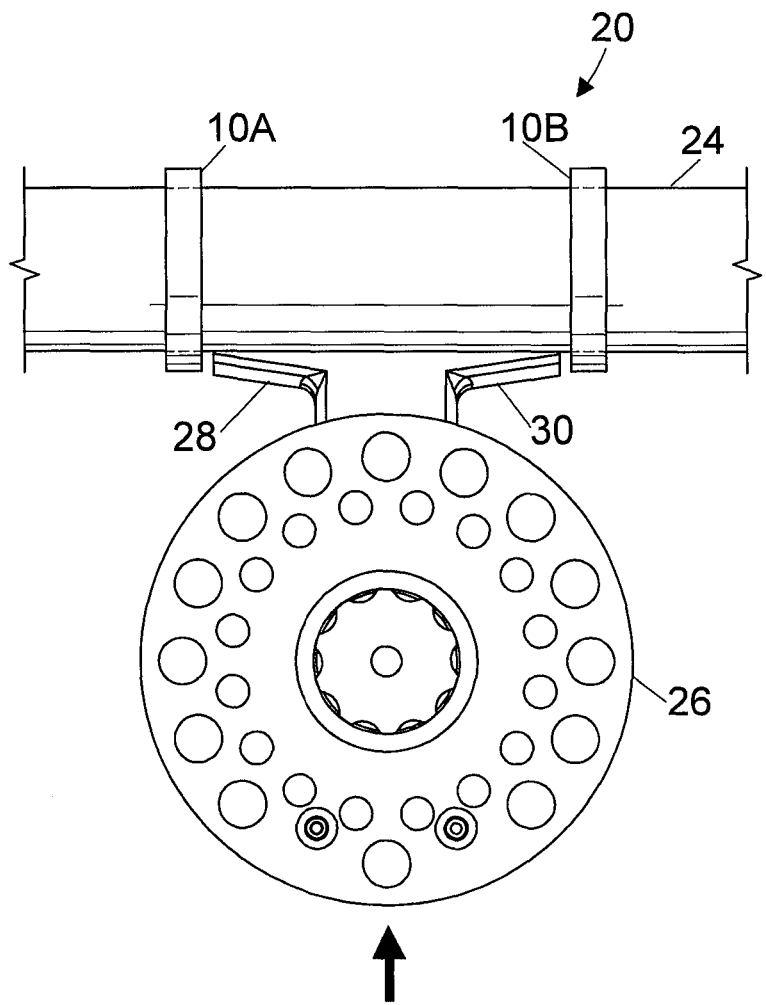
FIG. 6 is a fragmented elevation view as in FIG. 5 with a reel positioned between the two elastic bands.
Figure 7:
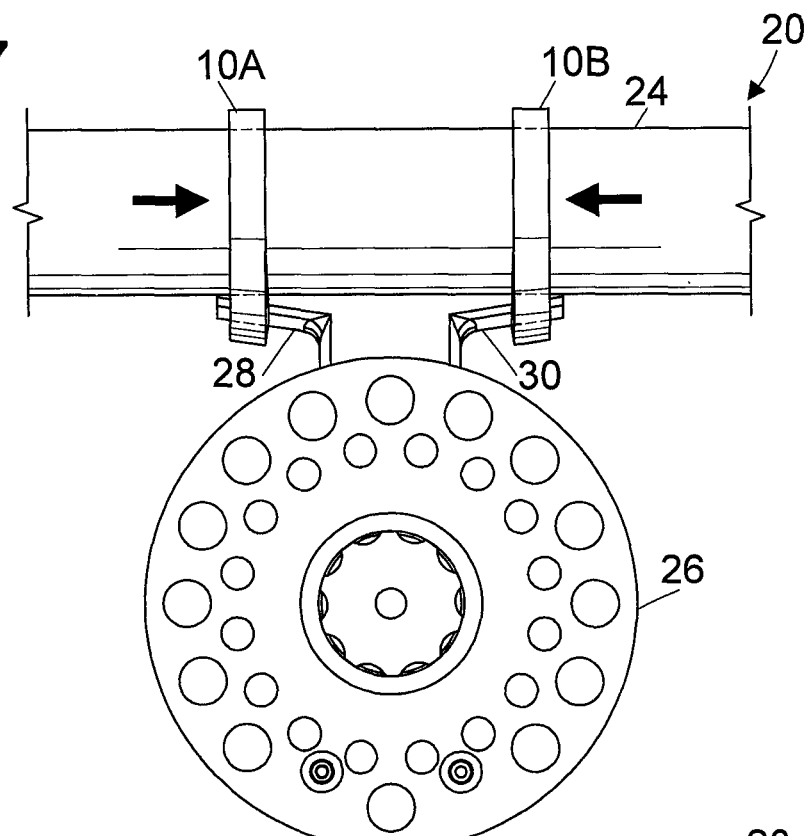
FIG. 7 is a fragmented elevation view as in FIG. 6 with the elastic bands positioned over the feet of the reel.

FIGS. 5-7 illustrate the sequence of installing reel 26 and elastic bands 10A and 10B on handle 24. In FIG. 5 first elastic band 10A and second elastic band 10B are positioned in spaced-apart relationship around handle 24. It is noted that the elastic bands 10A and 10B are spaced far enough apart so that the first 28 and second 30 feet of reel 26 can be placed between the two bands. In FIG. 6 reel 26 is positioned to contact handle 24 between first elastic band 10A and second elastic band 10B. Then in FIG. 7 first elastic band 10A is positioned over first foot 28, and second elastic band 10B is positioned over second foot 30. Reel 26 is now securely held to handle 24 by the elastic bands. The positioning (in the direction of the arrows) of elastic bands 10A and 10B is effected by a combination of rolling and nudging which are discussed below.

Figure 8:
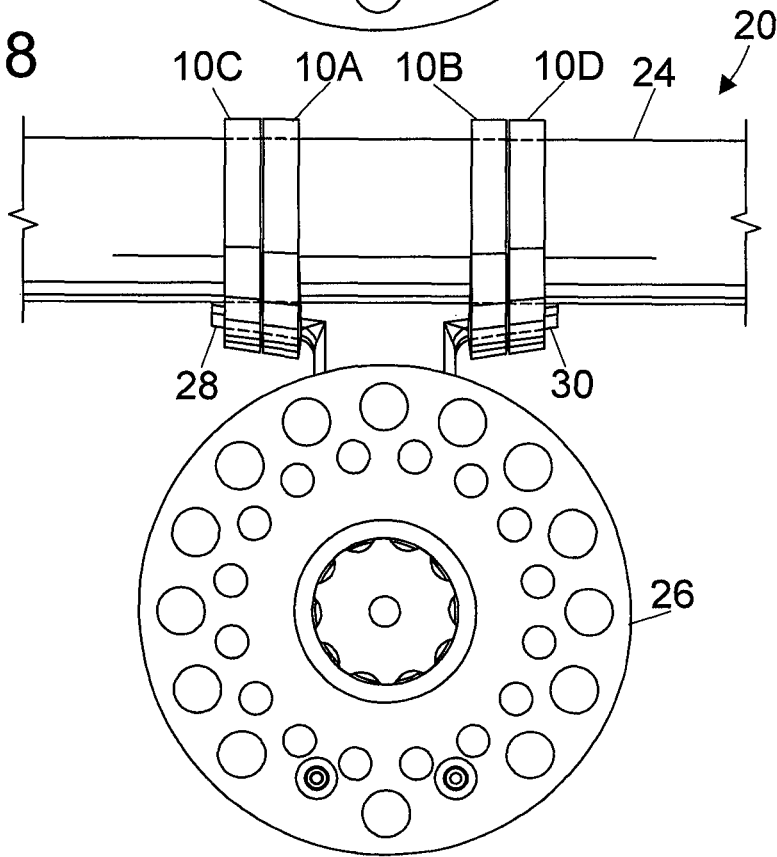
FIG. 8 is a fragmented elevation view of four elastic bands holding the reel on the handle.

FIG. 8 is a fragmented elevation view of four elastic bands holding the reel 26 on the handle 24. A third elastic band 10C surrounds handle 24 and first foot 28. Third elastic band 10C is disposed adjacent to first elastic band 10A. A fourth elastic band 10D surrounds handle 24 and second foot 30, fourth elastic band 10D is disposed adjacent to second elastic band 10B. This embodiment provides greater reel-retaining strength for heavier fishing apparatus. As with first 10A and second 10B elastic bands, the third 10C and fourth 10D elastic bands each have an unstretched width W of between 5 mm and 7 mm, with a nominal width W of 6 mm.

Figure 9:
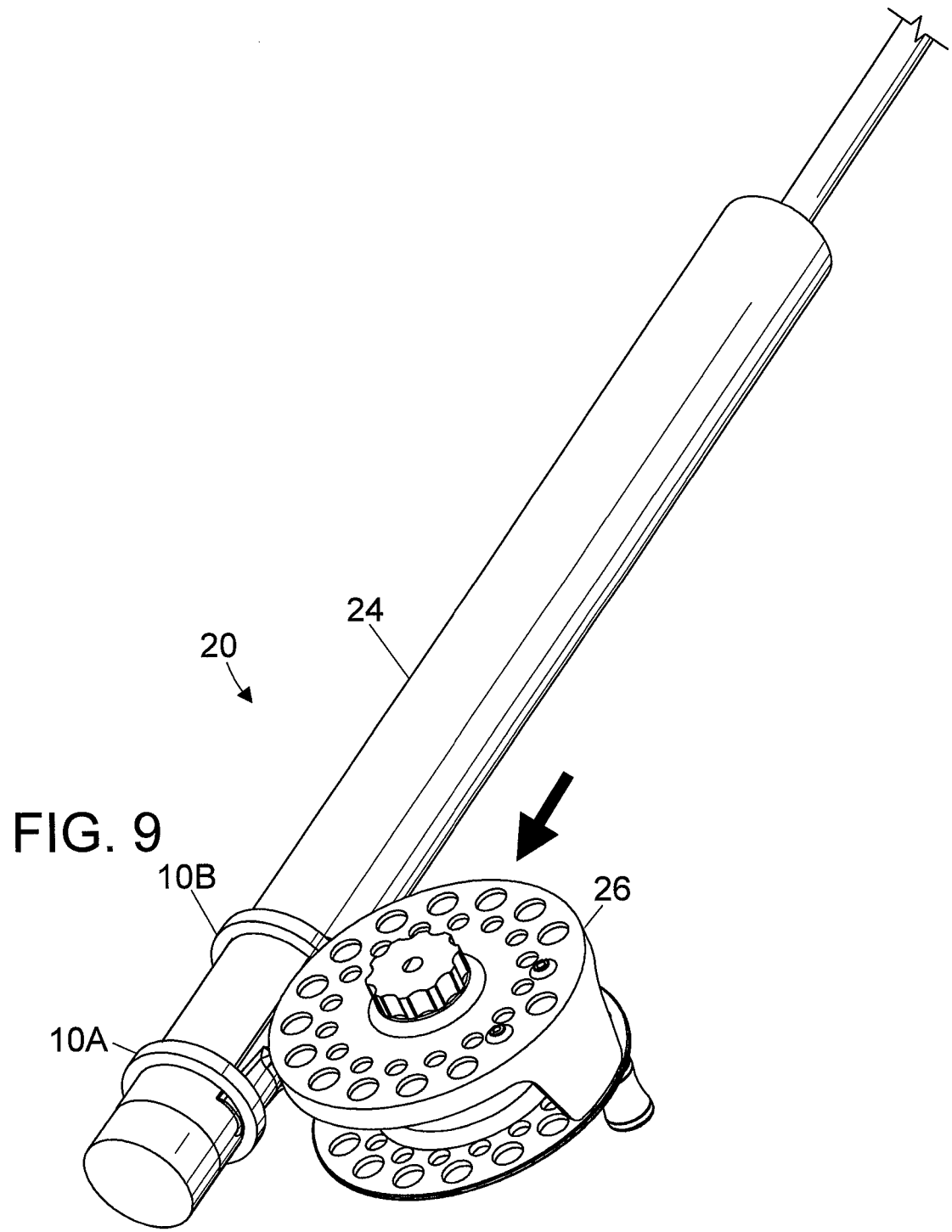
FIG. 9 is a perspective view of the reel installed at a different location on the handle.

FIG. 9 is a perspective view of the reel 26 installed at a different location on the handle 24. In the shown embodiment the reel 26 is a fly reel and has been positioned near the heel of handle 24. It may be appreciated that similarly reel 26 can be positioned at any location along handle 24 that is desired by the user. Elastic bands 10 permit easy and dynamic repositioning of reel 26 on handle 24. Further elastic bands 10 allow easy switching from fly to spinning reels and vice versa.

Figure 10:
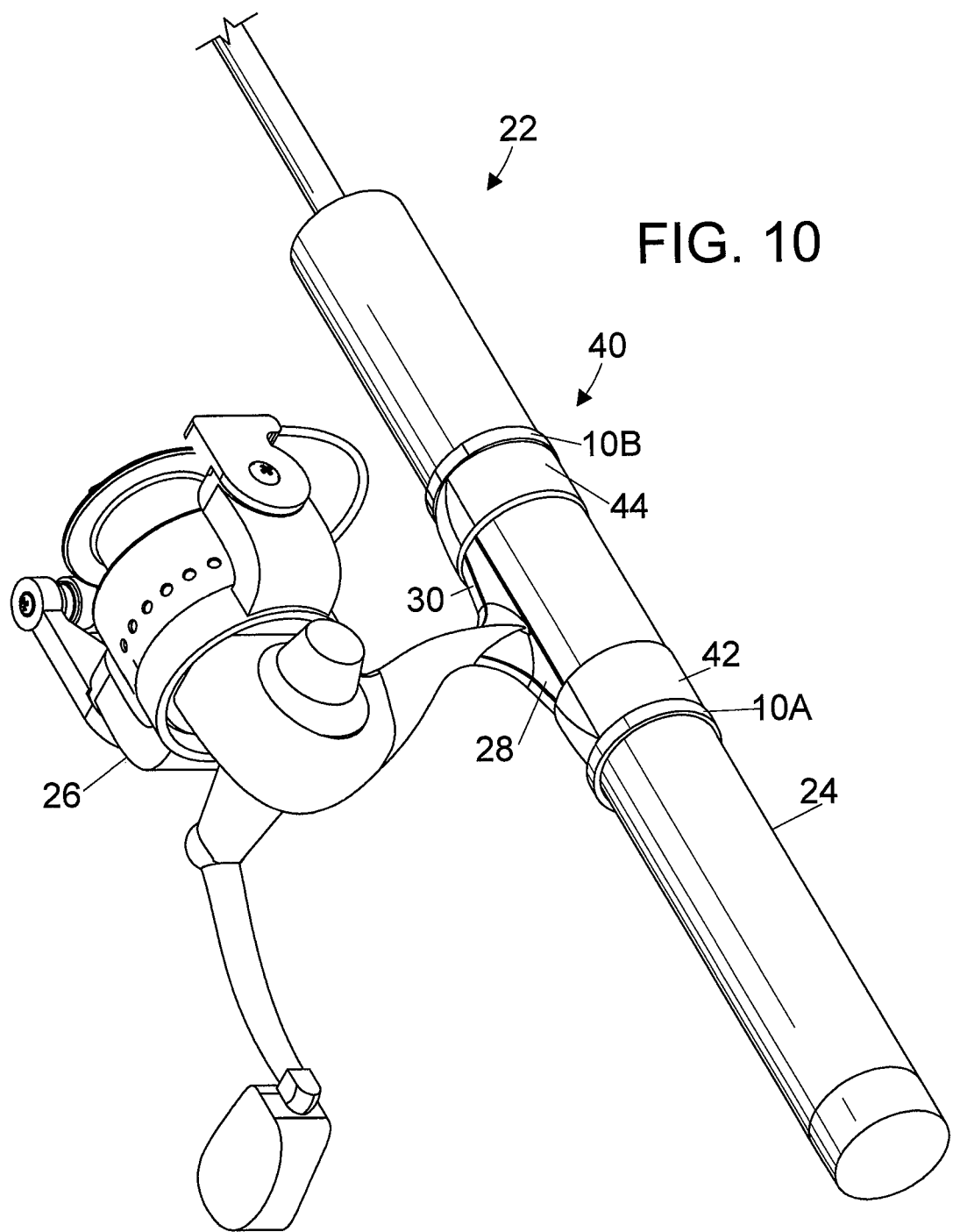
FIG. 10 is a perspective view of a second embodiment of the retaining system for fishing apparatus in accordance with the present invention.

Now referring to FIG. 10 there is illustrated a perspective view of a second embodiment of a retaining system for fishing apparatus in accordance with the present invention, the second embodiment retaining system generally designated as 40. Retaining system 40 includes a fishing rod 22 having a handle 24. Handle 24 is cylindrical and typically fabricated from cork, and in the shown embodiment has a diameter D of 25.4 mm (refer to FIG. 5). A reel 26 (a spinning reel as shown) is connected to handle 24. Reel 26 has a first foot 28 and a second foot 30. Fishing rod 22 further includes a first sleeve 42 which connects first foot 28 to handle 24, and a second sleeve 44 which connects second foot 30 to handle 24. A first elastic band 10A surrounds handle 12 and abuts first sleeve 42, and a second elastic band 10B surrounds handle 24 and abuts second sleeve 44 (these are the elastic band 10 of FIGS. 1-3). That is, elastic bands 10A and 10B retain (hold) first sleeve 42 and second sleeve 44 in place on handle 24 by preventing the sleeves from moving along the handle 24. In an embodiment, first 10A and second 10B elastic bands each have an unstretched width W of between 5 mm and 7 mm, with a width of 6 mm being nominal (refer also to FIGS. 1-3 and the associated discussion). As will be discussed later, the dimensions of first 10A and second 10B elastic bands changes slightly when the bands are stretched to install on handle 24. It is noted that elastic bands 10A and 10B may be installed on handle 24 from the heel end of the handle or in some cases from the rod end. Moreover, the elastic bands can be a multitude of colors to add a fashionable look to the fishing rod. It is also noted that the elastic bands can provide a friction-enhancing surface to improve the user's grip of the handle. Also, additional elastic bands can be positioned at desired locations on the handle to provide an even better grip for improved casting performance.

Figure 11:
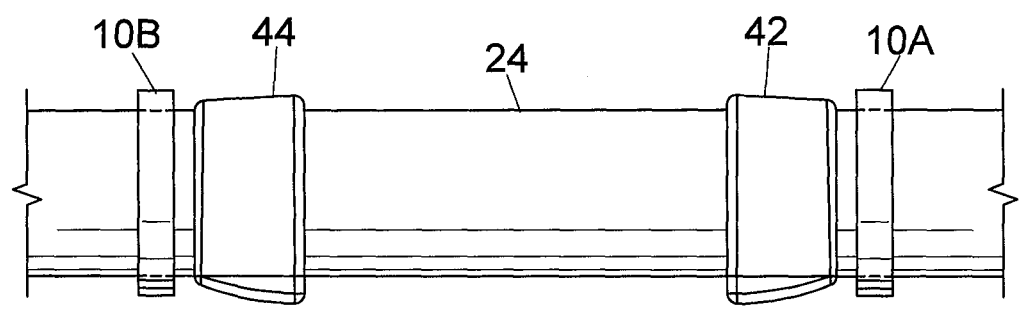
FIG. 11 is a fragmented elevation view of a handle of a fishing rod with two sleeves and two elastic bands installed.
Figure 12:
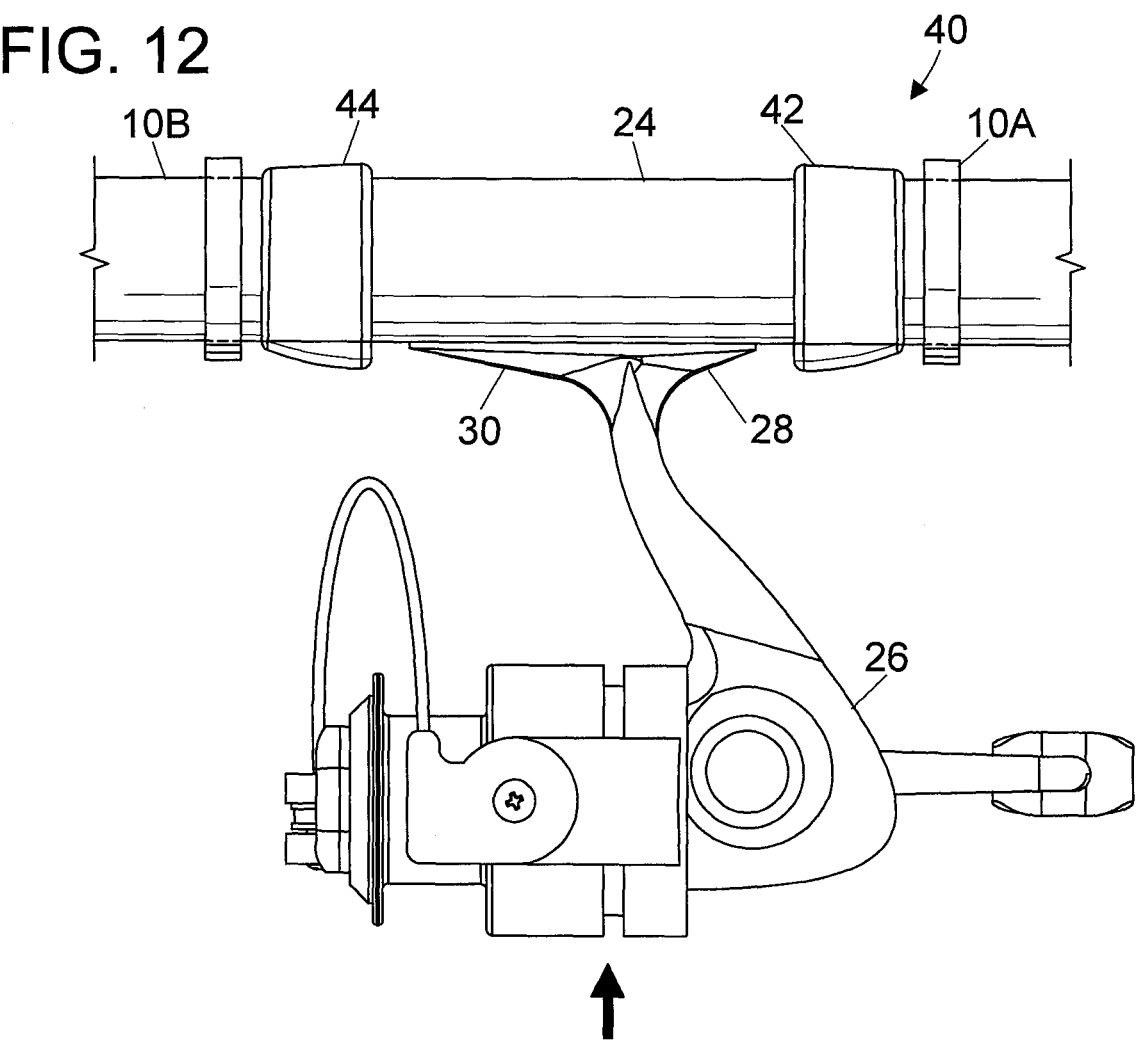
FIG. 12 is a fragmented elevation view as in FIG. 11 with a reel positioned between the two sleeves.
Figure 15:
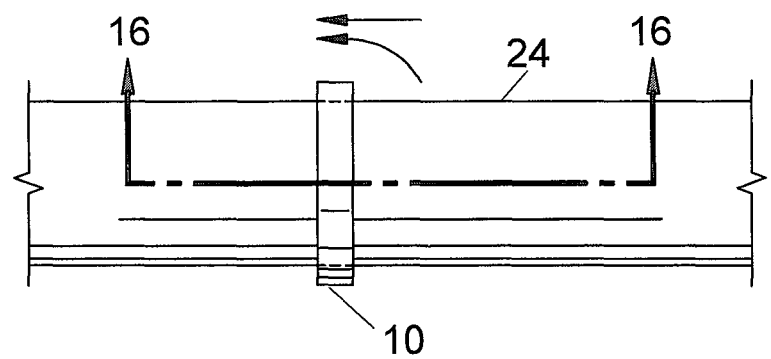
FIG. 15 is a top plan view of an elastic band installed on the handle.

FIGS. 11-14 illustrate the sequence of installing reel 26 and elastic bands 10A and 10B on handle 24. In FIG. 11 first elastic band 10A and second elastic band 10B are positioned in spaced-apart relationship around handle 24 where both first sleeve 42 and second sleeve 44 are disposed between first elastic band 10A and second elastic band 10B. It is noted that first sleeve 42 and second sleeve 44 are separated far enough apart so that first 28 and second 30 feet of reel 26 can be placed between the two sleeves. In FIG. 12 reel 26 is positioned to contact handle 24 between first sleeve 42 and second sleeve 44. Then in FIG. 13 first sleeve 42 is positioned over first foot 28, and second sleeve 44 is positioned over second foot 30. Reel 26 is now securely held to handle 24 by the two sleeves. Then in FIG. 14 first elastic band 10A is positioned in abutting contact with first sleeve 42, and second elastic band 10B is positioned in abutting contact with second sleeve 44 so that the sleeves are held in place on handle 24 and cannot become disengaged from the feet of the reel. The positioning (in the direction of the arrows) of elastic bands 10A and 10B is effected by a combination of rolling and nudging which are discussed below.

FIGS. 15-18 illustrate the process of rolling elastic band 10 along handle 24. Elastic band 10 is positionable along handle 24 by rolling (rotation over and over). It is first noted in FIG. 15 that when elastic band 10 is installed around handle 24 it becomes stretched and the dimensions of the band change from those of the relaxed state (refer to FIGS. 1-3). In general the band becomes longer, less wide, and less thick.

Figure 16:
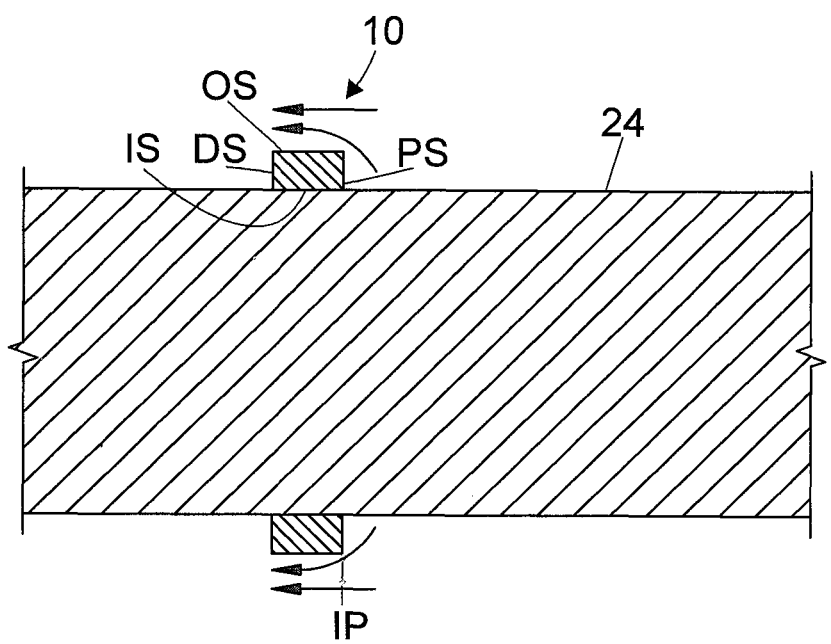
FIG. 16 is an enlarged cross sectional view along the line 16-16 of FIG. 15; showing the elastic band in an initial position.
Figure 17:
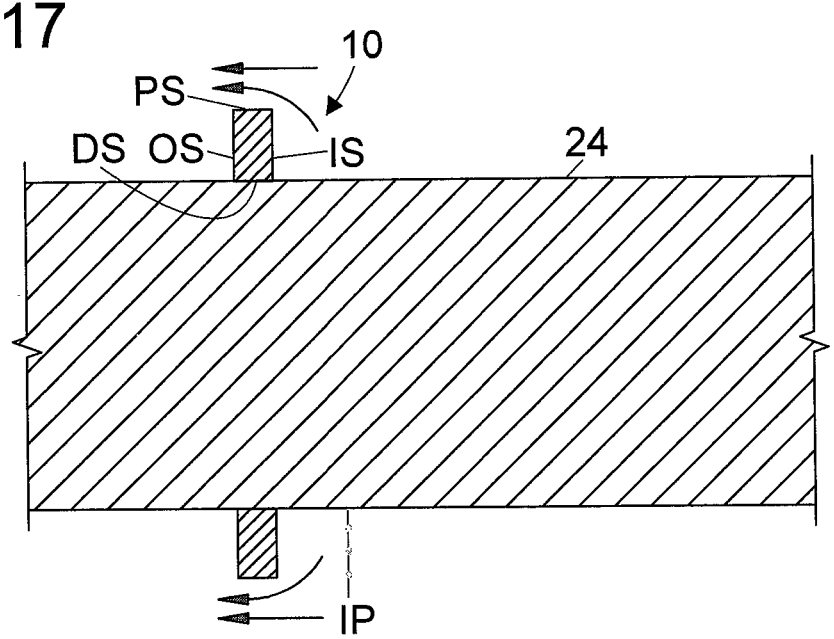
FIG. 17 is an enlarged cross sectional view as in FIG. 16 showing the elastic band rolled one-quarter rotation.
Figure 18:
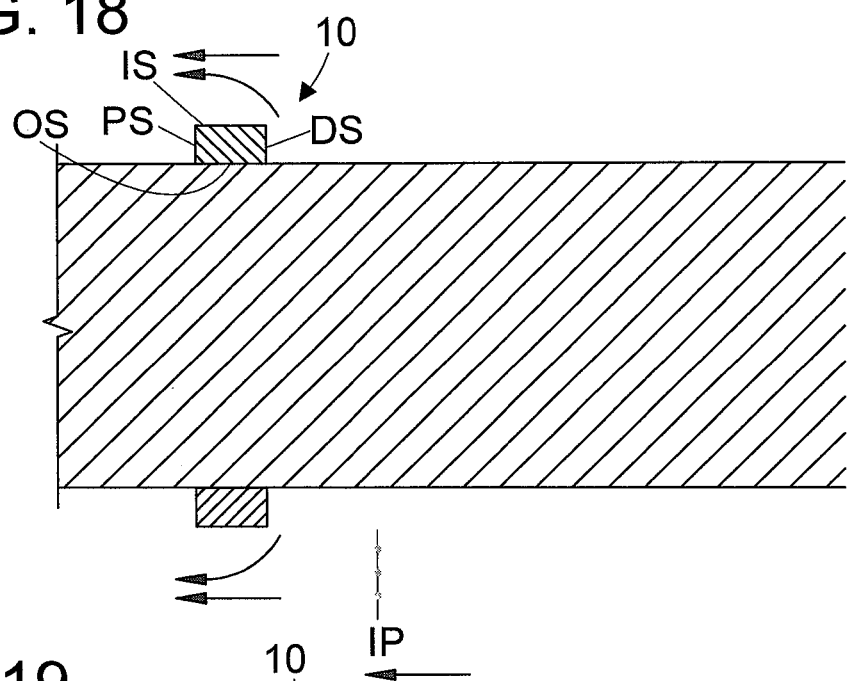
FIG. 18 is an enlarged cross sectional view as in FIG. 17 with the elastic band rolled one-half rotation.

In FIG. 16 elastic band 10 is at an initial position IP. Elastic band 10 has an inner side IS (the side which abuts handle 24), an outer side OS, a proximal side PS, and a distal side DS. The rolling process includes, from proximal side PS, urging (in the direction of the arrows) elastic band 10 along handle 24 causing elastic band 10 to rotate. Starting from the position of FIG. 16, during rolling the inner side IS breaks contact with handle 24 and the distal side DS makes contact with handle 24 (FIG. 17). Continued rolling causes the outer side OS to make contact with handle 24 (FIG. 18). An important feature of the rolling process is that during a portion of the rolling both inner side IS and the outer side OS are simultaneously not in contact with handle 24 (refer to FIG. 17). The urging process is best performed by simultaneously urging at two spaced apart locations on the elastic band (e.g. 180 degrees apart). This can be accomplished by urging with two thumbs positioned at contrapositioned locations on the band. The sequence shown in FIGS. 16-18 constitutes a one-half rotation of elastic band 10. It is also noted that after a one-half rotation the sides are reversed. That is, the inner side Is now the outer side and the proximal side is now the distal side. Continuing the rolling for another half rotation will return the edges to their relationship shown in FIG. 16. It is finally noted that when transitioning from the position of FIG. 17 to the position of FIG. 18 the elastic band 10 issues a distinctive "snapping" sound. It is noted that elastic band 10 can also be moved (fine positionally adjusted) by nudging, wherein force is applied to side PS so that elastic band 10 longitudinally moves along handle 24 without rotating.

Figure 19:
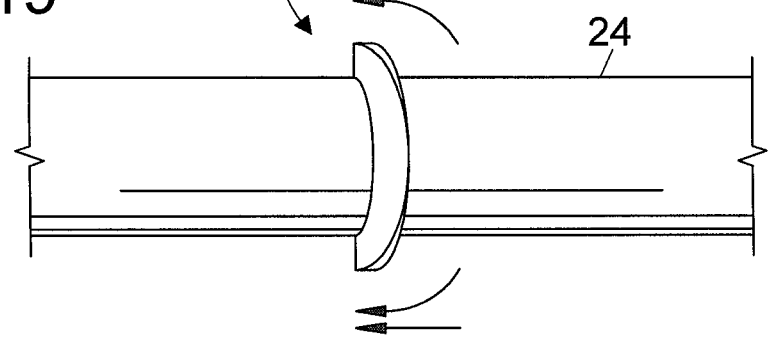
FIG. 19 is an elevation view showing the elastic band being rolled along the handle.

FIG. 19 is an elevation view showing the elastic band 10 being rolled along the handle; 24. The elastic band 10 is urged at two opposite points to effect the rolling. It is noted that the band does not roll uniformly, but rather the center section lags the two urging points.

Figure 20:
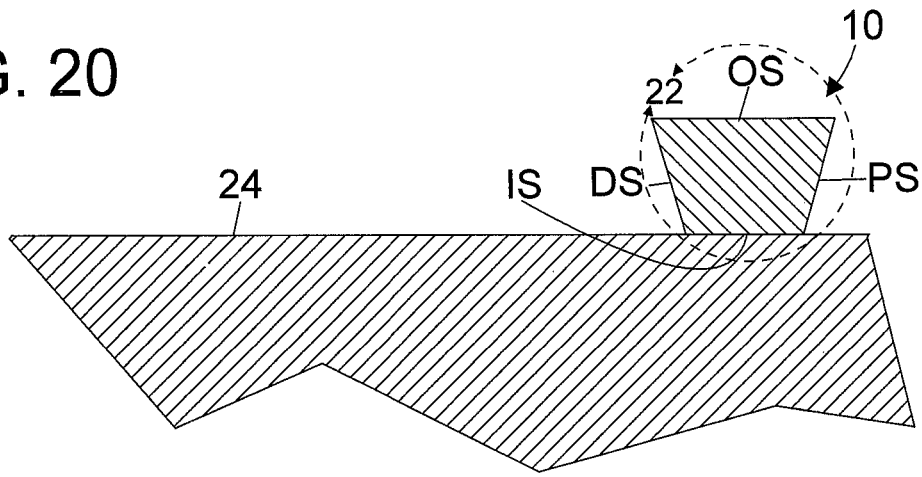
FIG. 20 is an enlarged cross sectional view showing the elastic band and the handle.
Figure 22:
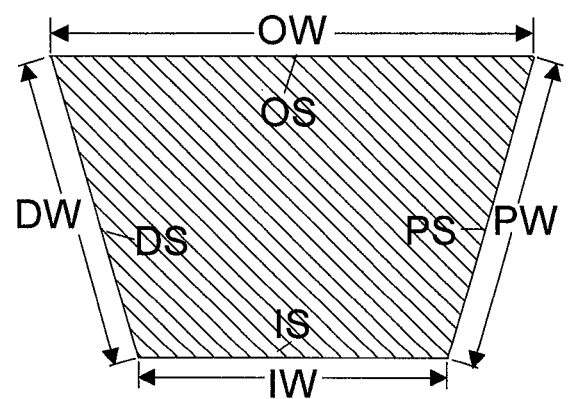
Figure 21:
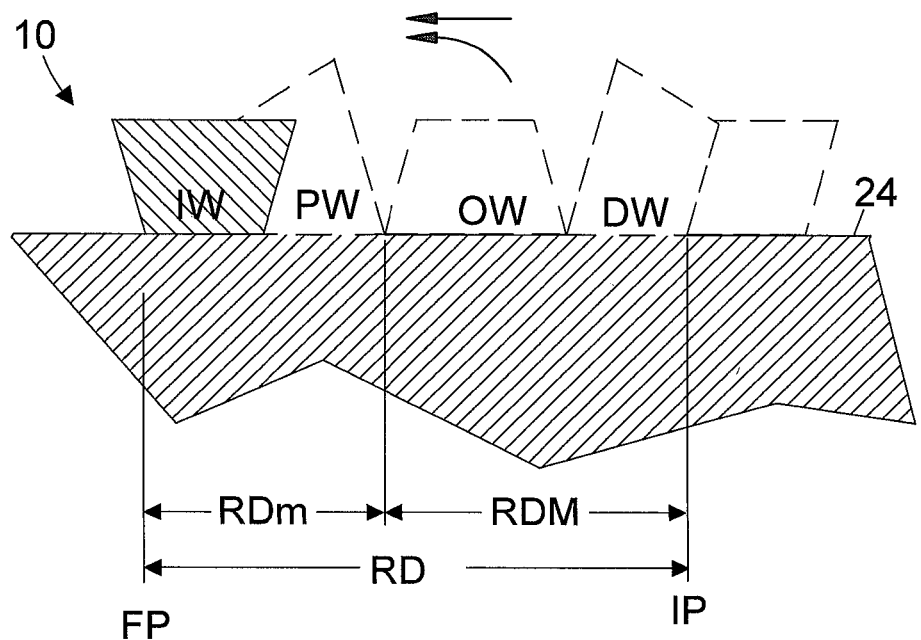
FIG. 21 is an enlarged cross sectional view showing the elastic band rolled one rotation; and, FIG. 22 is an enlarged view of the elastic band of area 22 of FIG. 20.

FIGS. 20 and 21 are enlarged cross sectional views which show how elastic band 10 rolls along handle 24, and FIG. 22 is an enlarged view of area 22 of FIG. 20. The rolling previously described in FIGS. 15-18 was somewhat simplified. In practice when elastic band 10 is installed around handle 24 it stretches and becomes slightly distorted, and in the shown embodiment has a cross section which is shaped like a trapezoid. Referring to FIGS. 20 and 22, elastic band 10 is at an initial position IP, and has an inner side IS having a width IW, an outer side OS having a width OW, a proximal side PS having a width PW, and a distal side DS having a width DW. In this position inner side IS abuts handle 24. In FIG. 21 elastic band 10 has been rolled one full rotation in the direction of the arrows so that the inner width IW once again abuts handle 24. During the rolling, first the distal width DW abuts handle 24, then the outer width OW, then the proximal width PW, and finally the inner width IW again. A roll distance RD is thereby defined as RD=DW+OW+PW+IW, which is the sum of the widths of the four sides. For the nominal elastic band width W of 6 mm (refer to FIGS. 1-3), in the stretched state around handle 24, DW is 3 mm, OW is 5.5 mm, PW is 3 mm, and VW is 4.5 mm, which makes the roll distance RD equal to 16 mm. That is, for each complete rotation of elastic band 10, the band moves a distance of 16 mm along handle 24. Similarly for a width W of 7 mm, IE IW and DW each increase by 1 mm (from the 5 mm embodiment), so the roll distance RD is 18 mm. And for a width W of 5 mm, IW and DW each decrease by 1 mm, so the roll distance RD is 14 mm. Therefore for a width W of between 5 mm and 7 mm, the roll distance RD will be between 14 mm and 18 mm (meaning 14 mm, 18 mm, or any value therebetween). In FIG. 21 it is noted that at two times during the rolling process both proximal width PW and distal width DW are simultaneously not in contact with handle 24. That is, at the times when only proximal width PW or distal width DW contact handle 24. Because elastic band 10 has a trapezoidal shape, the roll distance RD is asymmetrical and has two unequal parts. Roll distance RD is the sum of a major roll distance RDM and a minor roll distance RDm, major roll distance RDM being greater than minor roll distance RDm. That is, RD=RDM+RDm. where RDM>RDm. For the nominal elastic band 10 width W of 6 mm (refer to FIGS. 1-3), in the stretched state around handle 24, DW is 3 mm, OW is 5.5 mm, PW is 3 mm, and IW is 4.5 mm, which makes the roll distance RD equal to 16 mm. The major roll distance RDM is equal to DW+OW which equals 8.5 mm (5.5 mm+3.0 mm). And the minor roll distance RDm is equal to PW+IW which equals 7.5 mm (3.0 mm+4.5 mm).

In terms of use, a method for retaining fishing apparatus includes: (refer to FIGS. 1-9, and 15-21)
- (a) providing a fishing rod 22 having a handle 24;
- (b) providing a reel 26 having a first foot 28 and a second foot 30;
- (c) providing a first elastic band 10A and a second elastic band 10B, the first and second elastic bands each having an unstretched width W of between 5 mm and 7 mm;
- (d) positioning the first 10A and second 10B elastic bands around the handle 24 in spaced apart relationship;
- (e) positioning the reel 26 on the handle 24 between the first elastic band 10A and the second elastic band 10B so that the first foot 28 and the second foot 30 contact the handle 24;
- (f) positioning the first elastic band 10A over the first foot 28; and,
- (g) positioning the second elastic band 10B over the second foot 30.

The method further including:
in (c), the first 10A and second 10B elastic bands each having an unstretched width W of 6 mm.

The method further including:
providing a third elastic band 10C and a fourth elastic band 10D;
in (d), positioning the third elastic band 10C adjacent to the first elastic band 10A;
in (f), positioning the third elastic band 10C over the first foot 28;
in (d), positioning the fourth elastic band 10D adjacent to the second elastic band 10B; and,
in (g), positioning the fourth elastic band 10D over the second foot 30.

The method further including:
in (d), the first elastic band 10A having a inner edge IE, an outer edge OE, a proximal edge PE, and a distal edge DE;
in (d), the positioning including, from the proximal edge PE urging the first elastic band 10A along the handle 24 causing the elastic band to roll, wherein during a portion of said rolling the inner edge IE and the outer edge OE are simultaneously not in contact with the handle 24.

The method further including:
performing the urging simultaneously at two spaced apart locations on the first elastic band 10A.

The method further including:
in (d), the first elastic band 10A having an inner side IS, an outer side OS, a proximal side PS, and a distal side DS;
in (d), the positioning including, from the proximal side PS urging the first elastic band 10A along the handle 24 causing the elastic band to roll, wherein during a portion of the rolling the inner side IS and the outer side OS are simultaneously not in contact with the handle 24.

The method further including:
in (d), the positioning including rolling the first elastic band 10A along the handle 24, wherein the rolling has a roll distance RD of between 14 mm and 18 mm.

In another embodiment, a method for retaining fishing apparatus includes: (refer to FIGS. 1-3, and 10-21)
- (a) providing a fishing rod 22 having a handle 24, the handle 24 having a first slidable sleeve 42 and a second slidable sleeve 44;
- (b) providing a reel 26 having a first foot 28 and a second foot 30;
- (c) providing a first elastic band 10A and a second elastic band 10B, the first and second elastic bands each having an unstretched width W of between 5 mm and 7 mm;
- (d) positioning the first 10A and second 10B elastic bands around the handle 24 in spaced apart relationship wherein both the first 42 and second 44 sleeves are disposed between the first 10A and second 10B elastic bands;
- (e) positioning the reel 26 on the handle 24 between the first 42 and second 44 sleeves so that the first foot 28 and the second foot 30 contact the handle 24;
- (f) positioning the first sleeve 42 over the first foot 28, and positioning the second sleeve 44 over the second foot 30;
- (g) positioning the first elastic band 10A in abutting relationship with the first sleeve 42; and,
- (h) positioning the second elastic band 10B in abutting relationship with the second sleeve 44.

The method further including:
in (c), the first 10A and second 10B elastic bands each having an unstretched width W of 6 mm.

The method further including:
in (d), the first elastic band 10A having an inner side IS, an outer side OS, a proximal side PS, and a distal side DS;
in (d), the positioning including, from the proximal side PS urging the first elastic band 10A along the handle 24 causing the elastic band to roll, wherein during a portion of said rolling the inner side IS and the outer side OS are simultaneously not in contact with the handle 24.

The method further including:
performing the urging simultaneously at two spaced apart locations on the first elastic band 10A.

The method further including:
in (d), the positioning including rolling first elastic band 10A along the handle 24, wherein the first elastic band 10A has a roll distance RD which is the sum of a major roll distance RDM and a minor roll distance RDm, the major roll distance RDM being greater than the minor roll distance RDm.

The method further including:
in (d), the positioning including rolling the first elastic band 10A along the handle 24, wherein the rolling has a roll distance RD of between 14 mm and 18 mm.

Note: Unless specifically otherwise stated, and as applicable, the order of performance of the above cited method steps can be changed.

The embodiments of the retaining system and method for fishing apparatus described herein are exemplary and numerous modifications, combinations, variations, and rearrangements can be readily envisioned to achieve an equivalent result, all of which are intended to be embraced within the scope of the appended claims. Further, nothing in the above-provided discussions of the retaining system and method should be construed as limiting the invention to a particular embodiment or combination of embodiments. The scope of the invention is defined by the appended claims.

I claim:

1. A method for retaining fishing apparatus comprising:
   (a) providing a fishing rod having a handle, said handle having a first slidable sleeve and a second slidable sleeve;
   (b) providing a reel having a first foot and a second foot;
   (c) providing a first elastic band and a second elastic band, said first and second elastic bands each having an unstretched width W of between 5 mm and 7 mm;
   (d) positioning said first and second elastic bands around said handle in spaced apart relationship wherein both said first and second sleeves are disposed between said first and second elastic bands;
   (e) positioning said reel on said handle between said first and second sleeves so that said first foot and said second foot contact said handle;
   (f) positioning said first sleeve over said first foot, and positioning said second sleeve over said second foot;
   (g) positioning said first elastic band in abutting relationship with said first sleeve; and,
   (h) positioning said second elastic band in abutting relationship with said second sleeve.

2. The method of claim 1 further including:
   in (c), said first and second elastic bands each having an unstretched width W of 6 mm.

3. The method of claim 1 further including:
   in (d), said first elastic band having an inner side, an outer side, a proximal side, and a distal side;
   in (d), said positioning including, from said proximal side urging said first elastic band along said handle causing said elastic band to roll, wherein during a portion of said rolling both said inner side and said outer side are simultaneously not in contact with said handle.

4. The method of claim 3, further including:
   performing said urging simultaneously at two spaced apart locations on said first elastic band.

5. The method of claim 1, further including:
   in (d), said positioning including rolling said first elastic band along said handle, wherein said first elastic band has a roll distance RD which is the sum of a major roll distance RDM and a minor roll distance RDm, said major roll distance RDM being greater than said minor roll distance RDm.

6. The method of claim 1 further including:
   in (d), said positioning including rolling said first elastic band along said handle, wherein said rolling has a roll distance RD of between 14 mm and 18 mm.

* * * * *